US010689227B2

(12) United States Patent
Korhonen et al.

(10) Patent No.: US 10,689,227 B2
(45) Date of Patent: Jun. 23, 2020

(54) ELECTRIC LINEAR MOTOR

(71) Applicant: Kone Corporation, Helsinki (FI)

(72) Inventors: Tuukka Korhonen, Helsinki (FI); Tero Hakala, Helsinki (FI); Pasi Raassina, Helsinki (FI); Seppo Suur-Askola, Helsinki (FI); Marko Hinkkanen, Helsinki (FI); Seppo Saarakkala, Helsinki (FI); Maksim Sokolov, Helsinki (FI); Reza Hosseinzadeh, Helsinki (FI)

(73) Assignee: Kone Corporation, Helsinki (FI)

(*) Notice: Subject to any disclaimer, the term of this patent is extended or adjusted under 35 U.S.C. 154(b) by 0 days.

(21) Appl. No.: 16/273,310

(22) Filed: Feb. 12, 2019

(65) Prior Publication Data
US 2019/0300329 A1 Oct. 3, 2019

(30) Foreign Application Priority Data

Mar. 28, 2018 (EP) ..................................... 18164721
Apr. 24, 2018 (EP) ..................................... 18168990

(51) Int. Cl.
B66B 1/30 (2006.01)
H02K 41/03 (2006.01)
(Continued)

(52) U.S. Cl.
CPC ................ B66B 1/30 (2013.01); B66B 7/044 (2013.01); B66B 9/003 (2013.01);
(Continued)

(58) Field of Classification Search
CPC ........ B66B 1/30; B66B 7/044; H02K 41/031; H02K 41/033; H02P 6/006
(Continued)

(56) References Cited

U.S. PATENT DOCUMENTS 5,501,300 A * 3/1996 Cho ..................... B66B 11/0407
187/289
6,513,627 B1 * 2/2003 Cruise .................... B66B 15/08
187/258
(Continued)

FOREIGN PATENT DOCUMENTS

CN 204465314 U * 7/2015
EP 2131477 A2 12/2009
(Continued)

OTHER PUBLICATIONS

International Search Report PCT/ISA/210 for International Application No. PCT/FI2018/050763 dated Jan. 24, 2019.
(Continued)

Primary Examiner — Kawing Chan
(74) Attorney, Agent, or Firm — Harness, Dickey and Pierce, P.L.C.

(57) ABSTRACT

The invention refers to an electric linear motor, control apparatus, transport system and a method. The electric linear motor comprises a longitudinal stator beam; at least one mover at least partially surrounding the stator beam and adapted to move along the stator beam; which stator beam comprises at least two side faces located at opposite sides of the stator beam, each of the side faces carrying ferromagnetic poles spaced apart by a pitch, and which mover comprises at least two counter-faces facing the respective side faces of the stator beam. The mover has in at least one of said counter-faces rotor units having at least one winding and at least one permanent magnet arranged to co-act with the ferromagnetic poles of the respective side faces of the stator beam. The ferromagnetic stator poles of the stator beam and the rotor units of the mover are used for generating propulsion forces for driving the mover along the stator
(Continued)

beam as well as for generating attraction forces to levitate the mover around the stator beam while driving.

20 Claims, 8 Drawing Sheets

(51) Int. Cl.
  *H02P 6/00* (2016.01)
  *B66B 7/04* (2006.01)
  *B66B 11/04* (2006.01)
  *B66B 9/00* (2006.01)
  *H02K 7/09* (2006.01)
  *H02K 7/08* (2006.01)

(52) U.S. Cl.
  CPC ........ *B66B 11/0407* (2013.01); *H02K 41/031* (2013.01); *H02K 41/033* (2013.01); *H02P 6/006* (2013.01); *H02K 7/08* (2013.01); *H02K 7/09* (2013.01); *H02K 2201/03* (2013.01)

(58) Field of Classification Search
  USPC .......................................................... 318/135
  See application file for complete search history.

(56) References Cited

U.S. PATENT DOCUMENTS

| | | | | |
|---|---|---|---|---|
| 6,952,086 | B1 * | 10/2005 | Krefta | H02K 17/30 318/135 |
| 7,261,186 | B2 * | 8/2007 | Deplazes | B60L 13/10 187/277 |
| 9,150,116 | B2 * | 10/2015 | Matscheko | B60L 7/00 |
| 10,427,913 | B2 * | 10/2019 | Tangudu | B66B 17/12 |
| 2004/0217657 | A1 * | 11/2004 | Potter | H02K 5/04 310/12.18 |
| 2008/0018296 | A1 * | 1/2008 | Hashimoto | H02P 21/05 318/807 |
| 2014/0375235 | A1 * | 12/2014 | Yamashita | H02P 21/05 318/400.02 |
| 2015/0028699 | A1 * | 1/2015 | Hofstetter | H02K 41/031 310/12.31 |
| 2016/0083226 | A1 * | 3/2016 | Piech | B66B 11/0407 187/250 |
| 2017/0057791 | A1 * | 3/2017 | Hsu | B66B 7/00 |
| 2018/0105396 | A1 * | 4/2018 | Purosto | B66B 7/044 |
| 2018/0262146 | A1 * | 9/2018 | Raassina | H02K 11/21 |
| 2019/0300329 | A1 * | 10/2019 | Korhonen | B66B 1/30 |

FOREIGN PATENT DOCUMENTS

| | | |
|---|---|---|
| EP | 3373428 A1 | 9/2018 |
| WO | WO-2015084366 A1 | 6/2015 |
| WO | WO-2016206757 A1 | 12/2016 |

OTHER PUBLICATIONS

European Search Report with Patent Application No. 18164721.5 dated Oct. 12, 2018.
European Search Report with Patent Application No. 18168990.2 dated Nov. 15, 2018.

* cited by examiner

ELECTRIC LINEAR MOTOR

This application claims priority to European Patent Application No. EP18164721.5 filed on Mar. 28, 2018, and European Patent Application No. EP18168990.2 filed on Apr. 24, 2018, the entire contents of each which are incorporated herein by reference.

BACKGROUND OF THE INVENTION

The present invention relates to an electric linear motor having a linear longitudinal stator with ferromagnetic poles. The motor has a mover which comprises the rotor components of the electric motor e.g. in case of the current invention windings and permanent magnets. Thus, the mover travelling with a load-receiving part to be moved along the linear stator form a linear motor. In prior art linear motors, stator typically comprises motor windings and/or permanent magnets. A disadvantage of these motors is caused by the fact that the linear stator comprising windings and/or permanent magnets are quite expensive, particularly if longer trajectories, such as higher elevator shafts are considered with a length of e.g. 50 m or more. Furthermore, the weight of such a linear stator adds up considerably when used already for a mid-rise elevator. Also the power electronics required in the shaft to drive said linear motor may be complicated and expensive.

SUMMARY OF THE INVENTION

It is therefore object of the present invention to provide an electric linear motor which is comparably cheap to manufacture and which is well adapted also for long movement paths. Accordingly, a solution for controlling the motor is also provided to reduce friction between stator and mover(s) without additional components. This means that also more effective (e.g. due to reduced friction losses), simple and reliable linear motor and/or linear motor control apparatus is provided.

This object is solved with an electric linear motor, a control apparatus, a transport system according to claim 11 and a method according to example embodiments. Embodiments of the invention are also shown in the description and in the drawings. The inventive content may also consist of several separate inventions, especially if the invention is considered in the light of explicit or implicit subtasks or with respect to advantages achieved. In this case, some of the attributes contained in the claims below may be superfluous from the point of view of separate inventive concepts. The features of different embodiments of the invention can be applied in connection with other embodiments within the scope of the basic inventive concept.

A first aspect of the invention is an electric linear motor, comprising a longitudinal stator beam and at least one mover adapted to move along the stator beam. The stator beam comprises at least two side faces located at opposite sides of the stator beam, each of the side faces carrying ferromagnetic poles spaced apart by a pitch. The mover comprises at least two counter-faces facing the respective side faces of the stator beam. The mover has in at least one of said counter-faces at least one rotor unit having at least one winding and at least one permanent magnet, which are arranged to co-act with the ferromagnetic poles of the respective side face of the stator beam.

According to the preferred embodiment, the mover has in each of said counter-faces at least one rotor unit having at least one winding and at least one permanent magnet, which are arranged to co-act with the ferromagnetic poles of the respective side face of the stator beam. According to an embodiment, the mover has in the other counter face permanent magnets but with no windings. Counter face with permanent magnets only is not considered as a "rotor unit" as no propulsion force may be generated in the travelling direction of the mover.

The term "rotor unit" means independently controllable rotor entity. Thus the winding(s) of said rotor unit is/are configured to be supplied, with a separate controllable drive unit like inverter such that independent control of current of the winding(s) is possible. The linear motor is configured according to the invention to enable air gap control interlinked with movement control in the travelling direction, with windings of the rotor units, such that mover may be levitated around the stator beam while travelling along the stator beam.

The feature "at least two side faces located at opposite sides of the stator beam" can mean that surface normals of said at least two side faces both have a vector component such that said vector components are in opposite directions. Therefore, attraction force components in opposite directions may be generated between the at least two rotor units and the ferromagnetic poles of the respective side faces of the stator beam, to enable air gap control of the mover in relation to the stator beam.

According to the invention, the at least one rotor unit comprises at least one winding and at least one permanent magnet. Preferably, the at least one rotor unit comprises permanent magnets and a three-phase winding. Additionally or alternatively, the at least one rotor unit may comprise a one-phase winding. According to an embodiment, each rotor unit comprises at least one permanent magnet and at least one winding. In a preferred embodiment each rotor unit comprises permanent magnets and motor winding, most preferably three-phase motor winding. The side-faces carrying ferromagnetic poles of the stator beam do not have any permanent magnets as well as no windings either.

Therefore each of said rotor units may be controlled independently as regards to controlling d-axis and q-axis current components.

This kind of motor type may be a stator-mounted permanent magnet (SMPM) motor wherein permanent magnet(s) and winding(s) is/are mounted to the mover. One suitable motor type is a flux-switching permanent magnet (FSPM) motor. Other suitable motor types may be, for example, doubly salient permanent magnet (DSPM) motor and flux reversal permanent magnet (FRPM) motor.

In an alternative embodiment motor may be a hybrid excitation (HE) synchronous machine.

A second aspect of the invention is a control apparatus of an electric linear motor according to the first aspect of the invention. The control apparatus comprises at least one drive unit configured to supply electrical power to the respective at least one rotor unit of the mover.

According to a preferred embodiment, the control apparatus comprises drive units configured to supply electrical power separately to the respective rotor units of the mover such that each rotor unit is supplied by a separate (at least one) drive unit.

This can mean that independently adjustable control currents may be provided to the windings of the rotor units at opposite sides of the stator beam, thus enabling air gap control of the motor. According to an embodiment, the drive units may have a common DC link to share regenerative power (e.g. braking power) between the rotor units.

A third aspect of the invention is a transport system comprising an electric linear motor according to the first aspect of the invention and a control apparatus according to the second aspect of the invention. The transport system further comprises a mobile load-receiving part coupled to the mover and arranged to travel along a trajectory defined by the stator beam by means of the propulsion force of the mover.

The transport system may be an elevator system, in which case the load-receiving part may be an elevator car, an elevator car sling or corresponding. The load receiving part may be configured to transfer passengers and/or cargo. The transport system may alternatively be an escalator, in which case the load-receiving part may an escalator step band or portion of the step band. The transport system may alternatively be a moving walk, in which case the load-receiving part may be the moving band or portion of the moving band. The transport system may alternatively be a belt conveyor, in which case the load receiving part may be belt of the belt conveyor. The transport system may alternatively be a vehicle or a train, in which case the load-receiving part may be mobile body or consist.

A fourth aspect of the invention is a method of controlling the electric linear motor according to the first aspect of the invention with a control apparatus according to the second aspect of the invention. The method comprises obtaining position information ($X_{act}$) of the mutual position of the ferromagnetic poles and the at least one rotor unit facing said ferromagnetic poles, the position information being obtained in the travelling direction (x) of the rotor unit, representing d, q-coordinate system of said at least one rotor unit by means of the position information ($X_{act}$) such that the d-axis of said rotor unit is in the direction of the ferromagnetic poles facing the rotor unit and the q-axis is orthogonal to the d-axis, obtaining information of length of air gap ($Y_{act}$) between the ferromagnetic poles and the at least one rotor unit facing said ferromagnetic poles, and supplying, by means of the at least one drive unit a d-axis current component to the at least one winding of the at least one rotor unit to adjust the length of air gap towards given reference value ($Y_{ref}$), wherein the d-axis current component is established based on the difference between air gap reference value ($Y_{ref}$) and obtained air gap length information ($Y_{act}$).

In a preferred embodiment the at least one rotor unit has winding and permanent magnets. The method comprises supplying, by means of the at least one drive unit a d-axis current component to the winding of the at least one rotor unit to adjust the length of air gap towards given reference value ($Y_{ref}$).

According to a preferred embodiment, the method comprises obtaining position information of the mutual position of the ferromagnetic poles and the rotor unit facing said ferromagnetic poles, the position information being obtained in the travelling direction of the rotor unit, representing d, q-coordinate systems of said rotor units by means of the position information such that the d-axis of each rotor unit is in the direction of the ferromagnetic poles facing the rotor unit and the q-axis is orthogonal (i.e. 90 degrees in the electrical angle of the motor) to the d-axis, obtaining information of length of air gap between the ferromagnetic poles and the rotor unit(s) facing the ferromagnetic poles, and supplying, by means of the drive units separate d-axis current components to the rotor units at the opposite sides of the stator beam to adjust the length of the air gaps towards given reference values, wherein the separate d-axis current components are established based on the difference between air gap reference value and obtained air gap length information.

The phrase "obtaining position information of the mutual position of the ferromagnetic poles and the rotor unit facing said ferromagnetic poles" means that said position may be measured with a suitable sensor or, alternatively or additionally, said position may be estimated, for example, from currents and voltages of the winding of a rotor unit, to get the position of the ferromagnetic pole(s) relative to the winding.

The phrase "mutual position between the ferromagnetic poles and the facing rotor unit(s) in the travelling direction of the respective rotor unit(s)" means the mutual position as measured in the intended travelling direction of the rotor unit, i.e. in the longitudinal direction in which the counter-face of the rotor unit travels along the side-face of the stator beam.

According to an embodiment, the mover has in at least one counter-face at least two rotor units arranged consecutively in the travelling direction, each of said rotor units having at least one winding and at least one permanent magnet, which are arranged to co-act with the ferromagnetic poles of the side face facing said rotor units.

According to a refinement, the ferromagnetic poles as well as the rotor units at the opposite sides of the stator beam are arranged symmetrically at the same level in the transverse direction of the stator beam such that the attractive force components between the rotor units and stator beam exist at the same level in the transverse direction of the stator beam.

According to an embodiment, stator beam comprises at least four side faces located two by two at opposite sides of the stator beam, such that the four side faces substantially cover circumference of the stator beam, each of the side faces carrying ferromagnetic poles spaced apart by a pitch. The mover comprises at least four counter-faces facing the respective side faces of the stator beam. The mover has in each of said counter-faces at least one, preferably at least two rotor units having at least one winding and at least one permanent magnet, which are arranged to co-act with the ferromagnetic poles of the respective side face of the stator beam. This can mean that an increased propulsion force may be provided while levitating with the linear motor.

According to an embodiment, the ferromagnetic poles are teeth provided on a side face of a ferromagnetic stator rod, which teeth are spaced apart by teeth gaps. The side-faces carrying ferromagnetic poles of the stator beam do not have any permanent magnets as well as no windings either. Therefore the stator is cheap and easy to manufacture, install and maintain.

According to an embodiment, the mover has in at least one, preferably in each of said counter-faces at least two rotor units arranged consecutively in the travelling direction, each of said rotor units having at least one winding and at least one permanent magnet, which are arranged to co-act with the ferromagnetic poles of the respective side face of the stator beam. This can mean that at least two separate force components may be provided at different locations by means of the rotor units such that tilting of air gap may be straightened to keep stator beam and mover separated when simultaneously levitating and driving with the linear motor.

According to an embodiment, at least one of said rotor units contains at least two rotors having windings connected in series or in parallel. This can mean that, within an rotor unit more uniform force distribution may be provided, both in direction of air gap (attraction force for levitation control of the mover) and in the travelling direction (propulsion force for speed control of the mover). In a refinement, each of said rotor units contains at least two rotors having windings connected in series or in parallel to provide even more uniform force distribution.

According to an embodiment, the electric linear motor comprises at least two movers adapted to move along the same stator beam, and the transport system comprises at least two independently movable load-receiving parts, each coupled to a different mover. This can mean that several independently movable load receiving parts may be moved along the same trajectory, such as several cars of a multicar elevator system.

According to an embodiment, the transport system comprises two parallel stator beams and at least two movers adapted to move along different stator beams, and wherein each of the load-receiving parts is coupled to said at least two movers. Therefore propulsion force of the transport system may be increased and load capacity of the load-receiving part may be increased as well.

According to an embodiment, at least two movers of the same stator beam are coupled to a same load-receiving part. This can also mean that propulsion force/load capacity of load-receiving part and thus the transport system may be increased. When combining this embodiment with the previous one, propulsion force and/or load capacity may be even further increased.

According to an embodiment, the mover has in each of said counter-faces at least two rotor units arranged consecutively in the travelling direction, each of said rotor units having at least one winding and at least one permanent magnet, which are arranged to co-act with the ferromagnetic poles of the respective side face of the stator beam. The control apparatus comprises drive units configured to supply electrical power separately to the respective rotor units of the same counter-face. The method comprises: supplying by means of the drive units separate d-axis current components to the rotor units of the same counter-face to straighten tilt of the air gap, the separate d-axis current components being established based on difference between air gap reference value and air gap length information. This can mean that at least two separate attraction force components may be provided at different locations on the same side of the stator beam by means of the rotor units such that tilting of air gap may be straightened to keep stator beam and mover separated when levitating and simultaneously driving with the linear motor.

According to an embodiment, the method comprises: obtaining travel position information and/or travel speed information of the mover, and feeding with the drive unit(s) to the winding(s) of the rotor unit(s) separate q-axis current components based on the difference between travel position reference and obtained travel position information and/or between travel speed reference and obtained travel speed information to adjust the travel position and/or speed towards said position and/or speed reference. The term "travel position information of the mover" means position information in the travel direction of the mover, in which direction the mover travels along the stator beam. Consequently, the term "travel speed information of the mover" means speed information in the travel direction of the mover, in which direction the mover travels along the stator beam. Contrary to prior art control systems, wherein common q-axis current components based on common current reference have been used to adjust propulsion force/speed, by using separate q-axis current components/current references for separate drive units according to the embodiment it is possible to better adapt to different physical conditions of separate drive units (for example different air gaps lengths) to maintain more even propulsion force between different drive units and thus more accurate and comfortable speed control of the mover.

According to an embodiment, the method comprises calculating the travel speed reference based on difference between travel position reference and travel position of the mover.

According to a refinement, the method comprises: when changing at least one of d-axis current component and q-axis current component of an rotor unit responsive to change of at least one of air gap length, travel position information and travel speed information, providing at the same time a correction term to the other of d-axis current component and q-axis current component to compensate the effect of change to the attraction force and/or propulsion force of the mover.

According to a refinement, the method comprises calculating a propulsion force reference value based at least on difference between travel position reference and obtained travel position information and/or between travel speed reference and obtained travel speed information of the mover, calculating an attraction force reference value based at least on difference between air gap reference value and air gap length information, and changing at least one of d-axis current component and q-axis current component of a rotor unit responsive to change in at least one of propulsion force reference value, attraction force reference value and air gap length information of the rotor unit.

The inventive motor, apparatus and control method has the advantage of reduced losses due to optimized current consumption as well as minimized friction due to levitation. Further advantage is improved ride comfort due to reduction of propulsion force ripple. Therefore the linear motor is well suitable e.g. for high elevators, particularly for elevators with a height of more than 50 m, preferably of more than 100 m. This linear motor concept is therefore adapted for any high-rise applications as this solution does not need any elevator ropes or counterweight which are an obstacle in the design of high-rise elevators because of the correlated weight. Of course the linear motor can also be used for other applications with long movement tracks as e.g. escalators, moving sidewalks moving ramps, trains and inclined elevators.

Preferably, the mover also has a power source as for example a battery or an accumulator, which is preferably also configured as back-up power source for the mover. The power back up is preferably designed for the electro-magnetic power elements of the motor connected with the mover as e.g. windings or permanent magnets. Thus, with this power source, all electric loads of the mover can be fed. These loads are in case of an elevator car also the lightings, ventilation, door drives and of any 10 devices of the elevator car as for example car display panels, loudspeakers, displays, etc. Furthermore, the power of a wireless data connection with any kind of conveyor control can be supplied with the power source. According to an embodiment, the battery/accumulator may be connected to a common DC link of all the drive units associated with the same load-receiving part (e.g. elevator car). The battery may be coupled directly or via a power-interrupting switch to the DC link, and/or there may be a voltage converter between battery and DC link to enable voltage difference between battery/DC link.

Preferably, the power supply from the shaft to mover is implemented wirelessly with coupled coils principle, whereby a primary coil being mounted to the environment or stator beam whereas a secondary coil is moving with the car.

When the mover arrives at a certain position, primary and secondary are coupled and power is fed from primary to secondary to a battery mounted to the mover. The primary coil may be located in every stopping floor.

The term "levitation" in connection with the invention means that an air gap between side-face and respective counter-face is maintained with current adjustment of the rotor unit(s). However, within the scope of the invention it may also be possible to use some additional guide elements to provide assisting guidance for the mover relative to the stator beam. On the other hand, in many embodiments the levitation may be implemented without any additional guide elements.

Following expressions are used as a synonym: element—element to be moved—elevator car; environment—elevator shaft—escalator track; stator poles—stator teeth; in an embodiment winding of a rotor unit may be in the form of one coil only.

For the skilled person it is obvious that components mentioned in connection with the present invention can be provided one one-fold or multi-fold according to the needs. For example, one stator beam can co-act with three movers located above each other at the element to be moved. Furthermore, two stator beams may be located at a wall of the environment or even more than two stator beams as e.g. three or four stator beams.

BRIEF DESCRIPTION OF THE DRAWINGS

The invention is now described hereinafter with respect to the enclosed drawing. In this drawing

DESCRIPTION OF THE PREFERRED EMBODIMENTS

It is emphasized that identical parts or parts with the same functionality are designated by the same reference numbers in all figures.

Figure 1:
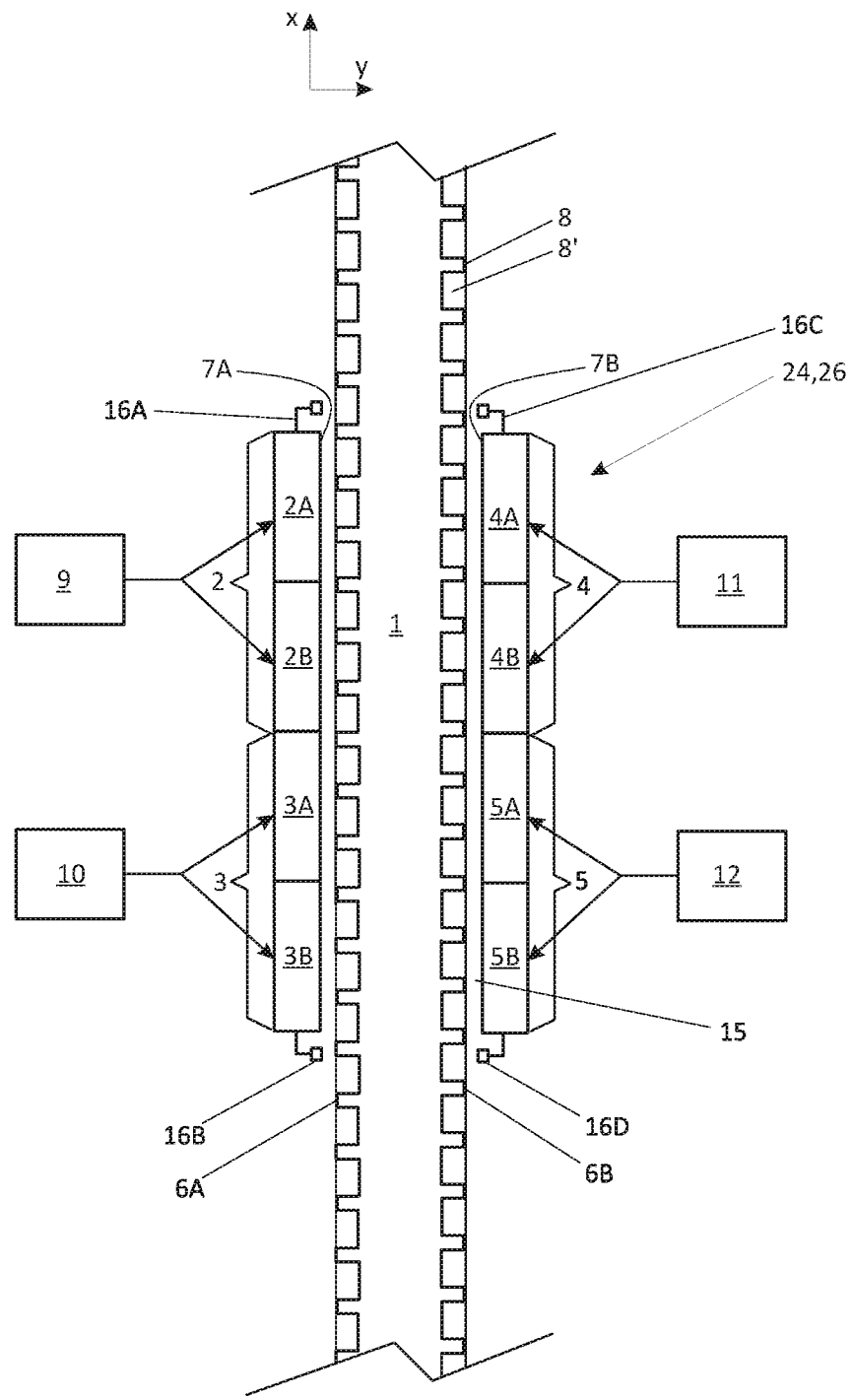
FIG. 1 shows a side view of an electric linear motor according to an embodiment
Figure 2A:
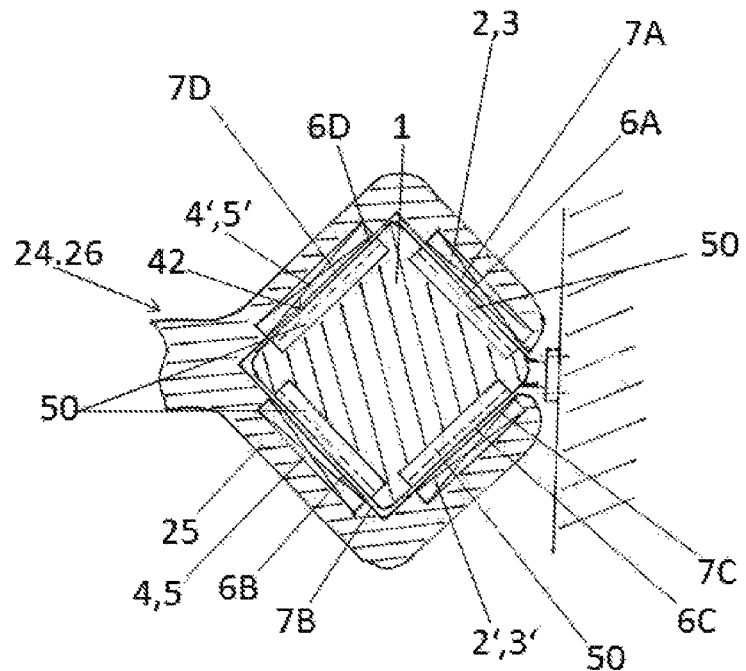
FIG. 2A shows a cross-section through a stator beam and a mover of FIG. 1.
Figure 2B:
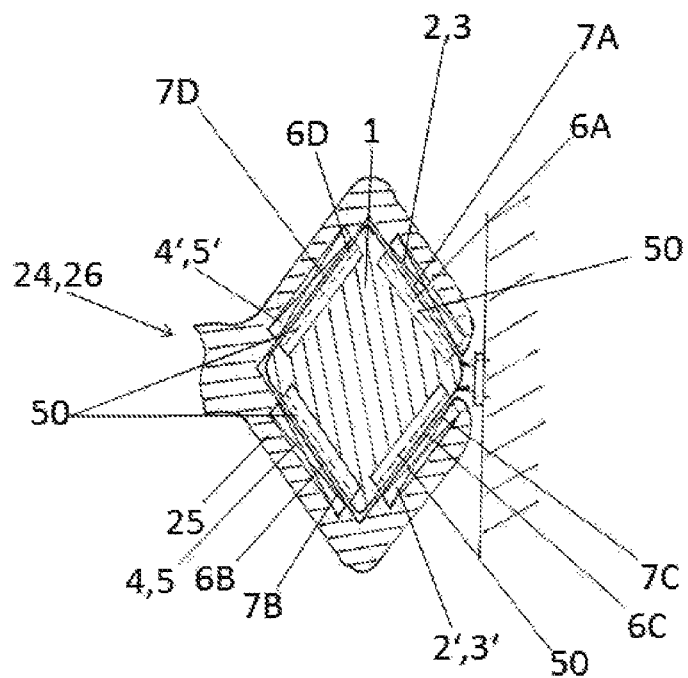
FIG. 2B shows a cross-section through a stator beam and a mover of FIG. 1 of an alternative modification.

FIG. 1 shows a side view of an electric linear motor. To facilitate understanding of the matter, only two opposite side faces 6A, 6B and respective counterfaces 7A, 7B of the motor are illustrated in FIG. 1. The linear motor comprises a longitudinal stator beam 1 and a mover 24, 26, which surrounds the stator beam 1. The stator beam 1 has four side faces 6A, 6B, 6C, 6D as illustrated in FIG. 2A and FIG. 2B. The side faces are located two by two at opposite sides of the stator beam 1, such that the four side faces 6A, 6B; 6C, 6D substantially cover circumference of the stator beam 1. Each of the side faces carries ferromagnetic poles 8, i.e. ferromagnetic teeth, spaced apart by a pitch 8', e.g. a gap or slot between the teeth 8.

The mover 24, 26 comprises four counter-faces 7A, 7B; 7C, 7D facing the respective side faces 6A, 6B; 6C, 6D of the stator beam 1.

Figure 3:
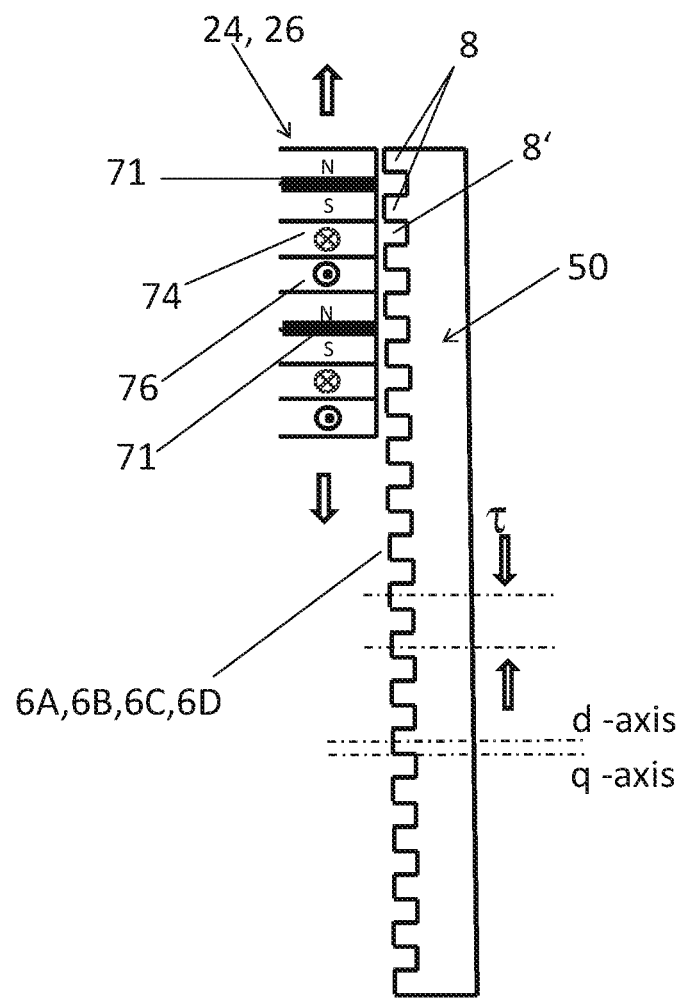
FIG. 3 shows a schematic drawing of the function of a switching permanent magnet motor (FSPM) according to an embodiment.

The mover has in each of said counter-faces 7A, 7B; 7C, 7D rotor units 2,3,4,5; 2',3',4',5'. The motor may be a flux-switching permanent magnet motor as depicted in FIG. 3. All the permanent magnets and three-phase motor windings are in the rotor units 2, 3, 4, 5. 3. In the embodiment of FIG. 3, the ferromagnetic poles 8 are teeth provided on a side face 6A, 6B; 6C, 6D of a ferromagnetic stator rod 50, which stator rod 50 is embedded into respective side-face of the stator beam.

The stator side of the motor is very simple, as the side-faces 6A, 6B; 6C, 6D of the stator beam carrying ferromagnetic poles 8 do not have any permanent magnets as well as no windings either. This simplicity is cumulative when the stator beam 1 becomes long to extend moving range of the mover 24, 26. When mover 24, 26 travels along the stator beam 1, there is an air gap 15 between the side faces 6A, 6B, 6C, 6D and the counter-faces 7A, 7B, 7C, 7D. This air gap 15 is maintained in a non-contact manner with levitation. The windings 74, 76 and permanent magnets 71 of the rotor units are arranged to co-act with the ferromagnetic poles 8 of the respective side faces 6A, 6B; 6C, 6D of the stator beam 1 to generate force components needed to levitate and drive the mover 24, 26 along the trajectory defined by the stator beam 1.

The expression "at least two side faces 6A, 6B, 6C, 6D located at opposite sides of the stator beam 1" means that surface normals of said at least two side faces ($n_1$, $n_2$, $n_3$, see FIG. 2C) both have a vector component such that said vector components are in opposite directions. Therefore, when attraction force is generated between said rotor units 2, 3, 4, 5 and the respective side faces 6A, 6B; 6C, 6D, the generated attraction forces have vector components in opposite directions relative to each other to enable adjustment of air gap length parallel to y-direction of FIG. 1 and therefore levitation of the mover.

Figure 2C:
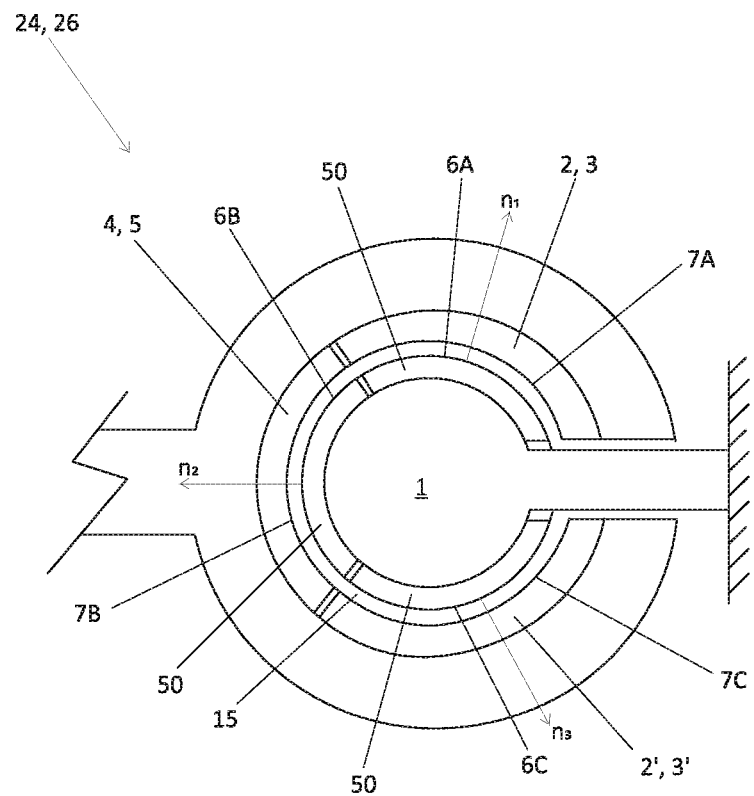
FIG. 2C shows a cross-section through a stator beam and a mover according to an embodiment of the invention.
Figure 2D:
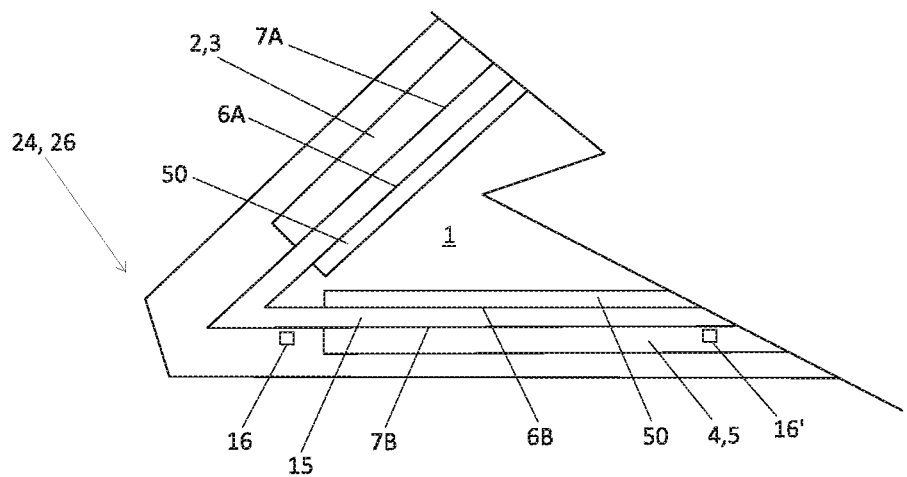
FIG. 2D shows a detail of a cross-section through a stator beam and a mover according to an embodiment of the invention.

Further, in some embodiments it may be necessary to control turning of the mover 24, 26 around the longitudinal axis (parallel to direction x of FIG. 1) of the stator beam. To enable this, stator and mover may be designed such that rotating torque is generated around the stator beam 1. Thus, as illustrated in FIG. 2D, at least some of the opposite side faces 6A, 6B may be inclined respective to each other, that is, angled from parallel direction around the longitudinal axis of the stator beam. Of course the respective counter faces 7A, 7B of the mover have to be inclined in the same manner to face the side faces 6A, 6B. As illustrated in FIG. 2C, at least some of the side faces 6A, 6B, 6C and the respective counter faces 7A, 7B, 7C may be curved. As illustrated in modification of FIG. 2B, the side faces 6A, 6B, 6C, 6D (and the respective counter faces 7A, 7B, 7C, 7D) may form a parallelogram. Also this modification may enable generation of rotating torque around the stator beam 1.

The mover frame 25 may be made of any suitable rigid, preferably light-weight material, such as glassfiber composite, carbon fibre composite or aluminium.

Figure 7:
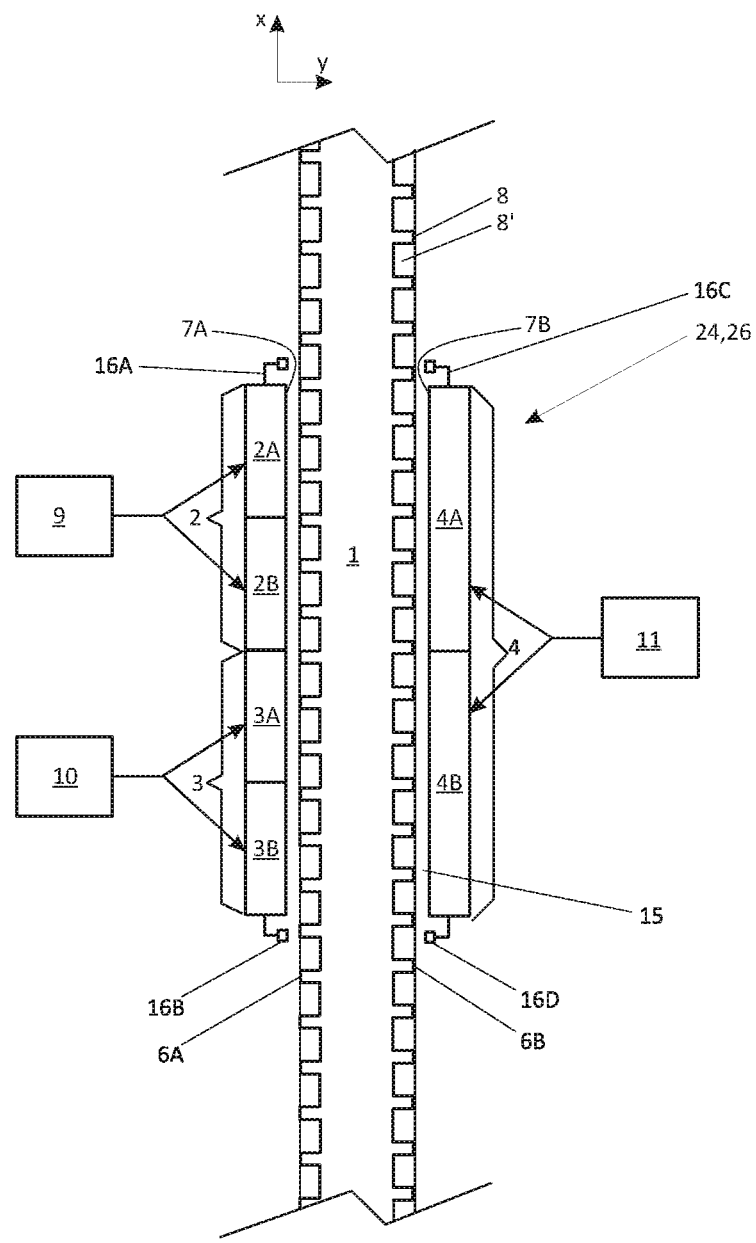
FIG. 7 shows a side view of an electric linear motor according to an embodiment.

As FIG. 1 shows, the mover 24, 26 has in each counter-face 7A, 7B two rotor units 2, 3; 4, 5 arranged consecutively in the travelling direction, which is parallel to direction x in FIG. 1. Two consecutive, rotor units are needed to straighten tilt of air gap 15. Each rotor unit is supplied with its own inverter 9, 10, 11, 12. In an alternative embodiment the mover 24, 26 has in each counter-face 7A, 7B three rotor units arranged consecutively in the travelling direction, and each rotor unit is supplied with its own inverter. In some other embodiments there may be even more than three rotor units per counter-face/inverters for supplying the same. Still in another embodiment, as illustrated in FIG. 7, the mover 24, 26 has in one counter-face 7A two rotor units 2, 3 arranged consecutively in the travelling direction, whereas the other counter-face 7B at opposite side of the stator beam 1 has only one, longer rotor unit 4. Each rotor unit 2, 3, 4 has an inverter 9, 10, 11. Also this kind of solution may be adequate to straighten tilt of air gap 15 with control of the rotor units. Further, to achieve uniform force distribution, each rotor unit has two (or even more than two) commonly controlled rotors 2A, 2B; 3A, 3B; 4A, 4B; 5A, 5B with windings. To achieve common control, windings of the different rotors of same rotor unit are connected in series or in parallel to be supplied with the same inverter 9, 10, 11, 12.

Figure 4:
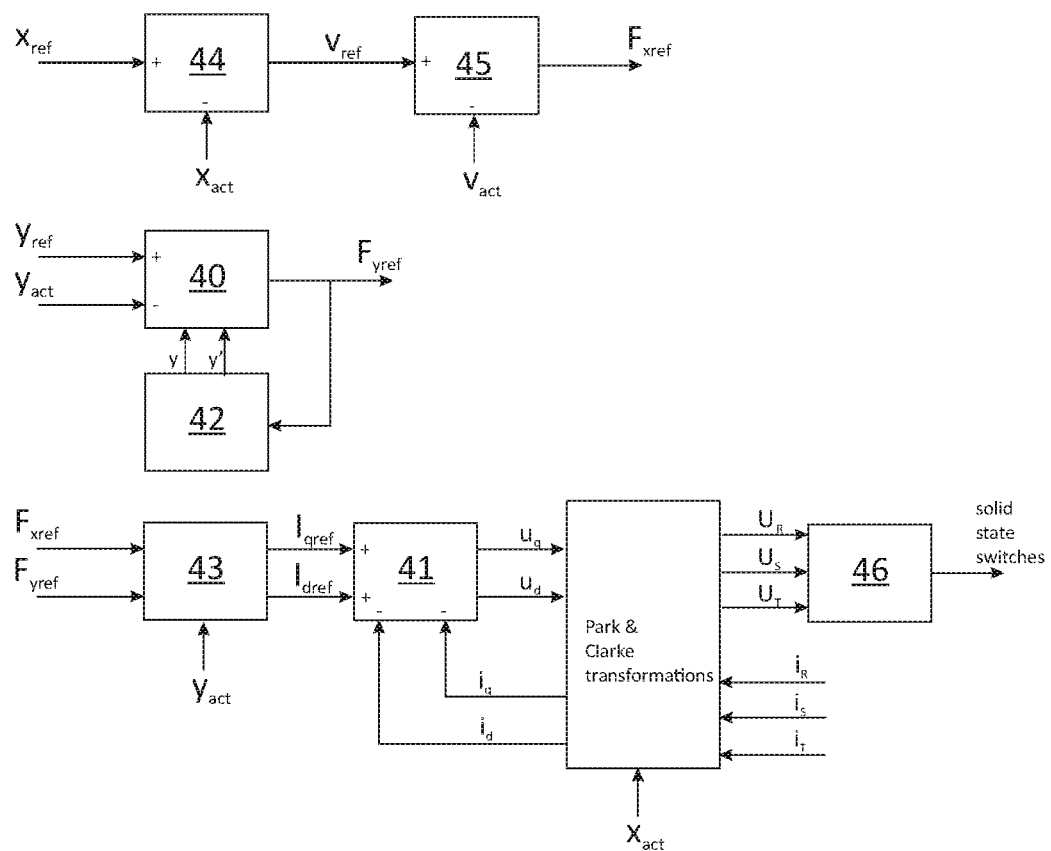
FIG. 4 illustrates schematically the control system according to an embodiment

FIG. 4 depicts a control architecture used to control levitation and travel of the linear motor of FIG. 1. The control architecture shows control elements which are implemented in the control software of the processing units of each inverter 9, 10, 11, 12.

According to FIG. 4, each inverter 9, 10, 11, 12 receives position information $X_{act}$ of the mutual position of the three-phase windings of the rotor unit controlled with corresponding inverter, and the ferromagnetic poles facing/co-acting with said three-phase windings. The mutual position $X_{act}$ is measured in the travelling direction, parallel to direction x in FIG. 1, by means of one or more position sensors 16A, 16B, 16C, 16D, which may be hall sensors or inductive proximity sensors, for example. Each inverter 9, 10, 11, 12 controls current supply of the rotor windings in a d, q-coordinate system of its own. The d, q coordinate system is synchronized by means of the position information $X_{act}$ to the position of ferromagnetic poles of the stator beam facing the rotor windings. The d-axis is referenced to the direction of the ferromagnetic poles 8 such that it is in the direction of the center line of the co-acting ferromagnetic pole. This direction may be the same as center line of the stator teeth (see FIG. 3); on the other hand it may also differ from that, e.g. due to saturation of the stator teeth. d-axis direction may also be defined otherwise: for example, to be in position wherein flux linkage of R-phase of the rotor unit has its maximum.

Each inverter 9, 10, 11, 12 receives also information of length of air gap ($Y_{act}$) between side-face 6A, 6B carrying the ferromagnetic poles 8 and the counterface 7A, 7B containing the rotor unit 2, 3, 4, 5. Air gap length information ($Y_{act}$) may be received from sensors 16A, 16B, 16C, 16D or, additionally or alternatively, from separate air gap sensors, such as eddy current sensors, which may be disposed at same locations as sensors 16A, 16B, 16C, 16D or which may replace one or more of the sensors 16A, 16B, 16C, 16D. To measure air gap length as well as air gap tilt in longitudinal direction of stator beam 1, at least two sensors are needed for example at opposite ends at opposite sides of the mover, for example at sensor positions 16A and 16D of FIG. 1.

Further, to measure turning of the mover 24, 26 around the longitudinal axis of the stator beam, two parallel air gap sensors 16, 16' may be disposed in transverse direction of air gap 15, as illustrated in FIG. 2D.

A reference value for the air gap $Y_{ref}$ is memorized in the processing unit of the inverter 9, 10, 11, 12. Air gap controller 40 calculates a difference between the air gap reference value $Y_{ref}$ and the air gap length information $Y_{act}$ and generates a reference value for the attraction force $F_{yref}$, e.g. the force component parallel to the y-direction of FIG. 1, to adjust the length of air gap $Y_{act}$ towards the reference value $Y_{ref}$. Air gap controller 40 is a state controller which uses observer 42 to obtain simulated position y and velocity y' (in the y-axis direction of FIG. 1) of the mover 24, 26 mass under the effect of the attraction force estimate $F_{yref}$.

In a first embodiment air gap controllers 40 of inverters controlling rotor units at both opposite sides of the stator beam are used to adjust air gap length. In a second alternative embodiment, on one side of the stator beam the reference value for the attraction force $F_{yref}$ is kept constant and air gap controller is used only in connection with rotor units of the other side of the stator beam to adjust attraction force reference value $F_{yref}$. This means the one or more rotor units of one side provide a constant attraction force against which the air gap controllers act at the other side of the stator beam. In a further alternative, no inverter/motor windings are used to generate a constant attraction force $F_{yref}$. Instead, at one side of the stator beam the rotor units of the counter face are replaced with permanent magnets only, which permanent magnets generate an attraction force towards the side face of the stator beam. On the other side of the stator beam rotor units with windings are controlled with air gap controllers of the inverters to act against the attraction force of said permanent magnets. With this solution no motor windings/inverters are needed for those counter faces with permanent magnets only.

Further, at least one of the inverters 9, 10, 11, 12 of a common mover receives travel position information $x_{act}$ and travel speed information $v_{act}$ of the mover. In this connection travel position information $x_{act}$ and travel speed information refers to position/speed information of the mover in the direction parallel to the x-axis direction of FIG. 1. In the current embodiment the same position information $x_{act}$ is used to define mutual position between rotor unit and respective ferromagnetic poles to synchronize d, q-axis of the drive unit/inverter to said ferromagnetic poles 8. This information is also used to control position $x_{act}$/speed $y_{act}$ of the mover along the stator beam 1. In this embodiment the travel position information $x_{act}$ is be received from the one or more sensors 16A, 16B, 16C, 16D but alternatively a separate sensor may be used. The travel speed information $y_{act}$ may be received from a separate speed sensor, such as an encoder or tachometer, or it may be obtained from timely variation of the travel position information $x_{act}$ (e.g. time derivative of the travel position information) which is the case in this embodiment. One of the inverters of a common mover acts as a master which performs position/speed control in the travelling direction of the mover and outputs a propulsion force reference value $F_{xref}$ (i.e. reference force component parallel to the x-axis direction of FIG. 1) to the other inverters 9, 10, 11, 12. Other inverters of the common mover then act as slaves, which do not perform position/speed control but propulsion force control only. If two or more movers are coupled to a common load-receiving means, such as to a common elevator car, it is also possible that only one inverter of only one mover acts as a master and all the other inverters/movers act as slaves to avoid interference of position/speed controllers.

Going back to FIG. 4, processing unit of the master inverter 9, 10, 11, 12 calculates travel position reference value $x_{ref}$ to establish an intended motion profile for the controlled mover(s). Position controller 44 calculates travel speed reference value $v_{ref}$ from the difference between travel position reference $x_{ref}$ and travel position of the mover $x_{act}$ in the travelling direction x of the mover. Speed controller 45 calculates a propulsion force reference value $F_{xref}$ from the difference between the travel speed reference $v_{ref}$ and the travel speed information $v_{act}$.

Propulsion force reference value $F_{xref}$, attraction force reference value $F_{yref}$ and air gap length information $Y_{act}$ are inputted into magnetic model 43, which calculates d-axis and q-axis current reference components $I_{dref}$, $I_{qref}$ for the rotor windings. In case of slave inverters, each slave inverter calculates its own attraction force reference value $F_{yref}$ by means of the air gap length information $Y_{act}$, but receives propulsion force reference value $F_{xref}$ from the master inverter. With these reference values as well as the air gap length information from air gap sensor 16A, 16B slave inverter calculates the d-axis and q-axis current component reference values with the magnetic model 43.

The magnetic model may consist of algorithms, which represent how attraction force and propulsion force of the motor depend on d-axis and q-axis currents as well as air gap length. This representation may be based on the following motor equations:

$$i_d = (a_{d0} - b_{dm}y)(\psi_d - \psi_r) + \left(b_d y + a_{dd}|\psi_d|^S + \frac{a_{dq}}{V+2}|\psi_d|^U|\psi_q|^{V+2}\right)\psi_q \quad (1)$$

$$i_q = \left(a_{q0} + b_q y + a_{qq}|\psi_q|^T + \frac{a_{dq}}{U+2}|\psi_d|^{U+2}|\psi_q|^V\right)\psi_q \quad (2)$$

$$F_x = \frac{3\pi}{\tau}(\psi_d i_q - \psi_q i_d) \quad (3)$$

$$F_y = -\frac{3}{2}[b_d\psi_d^2 + b_q\psi_q^2 - b_{dm}(\psi_d - \psi_r)^2] - \frac{f_\sigma}{(1+c_\sigma y)^2} \quad (4)$$

wherein $i_d$ and $i_q$ represent current components in d, q coordinate system, $a_{d0}$, $a_{dd}$, $a_{dq}$, $a_{q0}$, $a_{qq}$, $a_{dq}$, $b_{dm}$, $b_d$, $b_q$, $c_\sigma$, $f_\sigma$, $\psi_r$, S, T, U, V are motor-specific constants. They are derived based on reluctances, which depend on motor geometry. $\psi_d$ and $\psi_q$ are d and q-axis components of the motor flux linkage, τ is pole pitch of the motor (2π), y is air gap length between rotor and stator, and $F_x$ is propulsion force reference value and $F_y$ is attraction force reference value.

in view of the above equations, $F_x$ may be represented to be dependent only on magnetic flux linkage and air gap length y:

$$F_x(\psi_d, \psi_q, y)$$

also $F_y$ may be represented to be dependent only on magnetic flux linkage and air gap length y:

$$F_y(\psi_d, \psi_q, y).$$

Thus magnetic flux linkage components $\psi_d$ and $\psi_q$ may be solved by means of the representations (3) and (4) when the (reference) values of propulsion force $F_{xref}$ and attraction force $F_{yref}$ are received from the speed controller 45 and the air gap controller 40. Reference current values $I_{dref}$, $I_{qref}$ may then be calculated with the equations (1) and (2) by means of the magnetic flux linkage components $\psi_d$ and $\psi_q$.

Alternatively or additionally, the magnetic model 43 may comprise a table, having d-axis and q-axis current components memorized and indexed by means of propulsion force reference values $F_{xref}$, attraction force reference values $F_{yref}$, and air gap length information $Y_{act}$. To get more accurate values for the d, q-axis current reference components, it is possible to use interpolation between the memorized values of the table. Table values may also be determined with simulation, for example by using Finite Element Method (FEM).

In the magnetic model 43 at least one of d-axis current reference component $I_{dref}$ and q-axis current reference component $I_{qref}$ of the motor windings is changed when a change in at least one of the propulsion force reference value $F_{xref}$, attraction force reference value $F_{yref}$ and air gap length information $Y_{act}$ of the rotor unit 2, 3, 4, 5 takes place. Therefore magnetic model 43 may speed up adaptation of the rotor units and thus the mover to variable operation conditions, making operation of the mover 24, 26 more stable and responsive.

d-axis and q-axis current component reference values $I_{dref}$, $I_{qref}$ are communicated to current controller 41, which calculates d-axis and q-axis voltage references $U_d$, $U_q$ for the windings of the rotor unit based on the difference between d- and q-axis current reference values $I_{dref}$, $I_{qref}$ and measured d-axis and q-axis current components $I_d$, $I_q$. Transformation from d, q coordination system to three phase voltage components $U_R$, $U_S$, $U_T$, as well as transformation from three-phase current measurements $i_R$, $i_S$, $i_T$ to d, q-axis component values $I_d$, $I_g$ takes place with Park and Clarke transformations, which transformations as such are known in the art. For the synchronization of the d, q coordinate system travel position information $X_{act}$ is used as disclosed above.

The three-phase voltage components of the rotor unit $U_R$, $U_S$, $U_T$ are communicated to state vector PWM modulator 46 (pulse width modulator) of the inverter, which creates the control pulses for controlling the solid state switches of the inverter power stage to introduce modulated three-phase voltage components to the windings of the rotor unit. These solid state switches may be, for example, igbt-transistors, mosfet-transistors, silicon carbide transistors and/or gallium nitride transistors.

In an alternative embodiment, an adequate performance level may be achieved with a simplified control architecture, wherein the speed controller 45 of the master inverter outputs directly q-axis current reference components $I_{qref}$ to the slave inverters. Each slave inverter generates d-axis current reference component $I_{dref}$ of its own, by means of the air gap controller 40. These d, q-current reference components $I_{dref}$, $I_{qref}$ are then directly communicated to current controller 41, thus avoiding use of magnetic model 43, i.e. bypassing it. This may reduce processing power needed for levitation/speed control of the mover 24, 26.

Instead of one inverter 9, 10, 11, 12 acting as a master, it is possible to use a separate master control unit which may perform function of at least one of air gap controller 40, position controller 44 and speed controller 45 for one or more of the inverters 9, 10, 11, 12 and output the required reference values to the inverters 9, 10, 11, 12 to control current supply to the rotor units.

Figure 5:
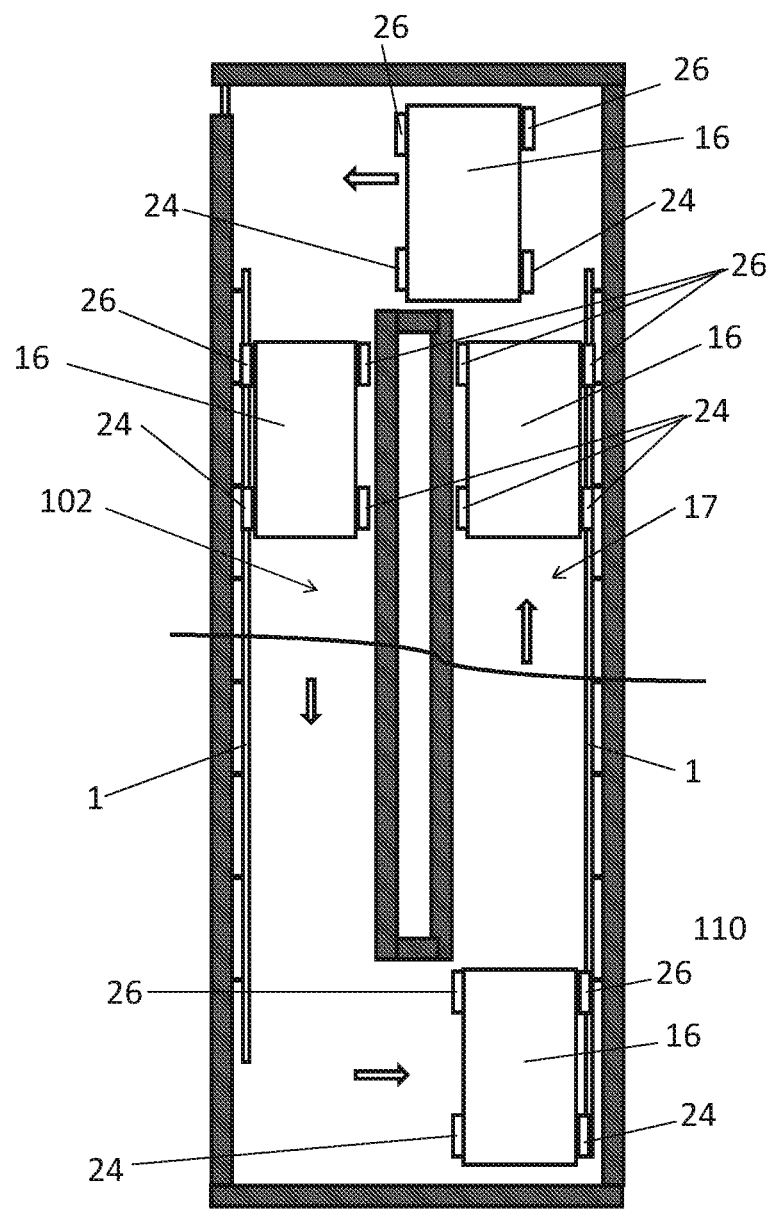
FIG. 5 shows a side view of a multi-car elevator system according to an embodiment.
Figure 6:
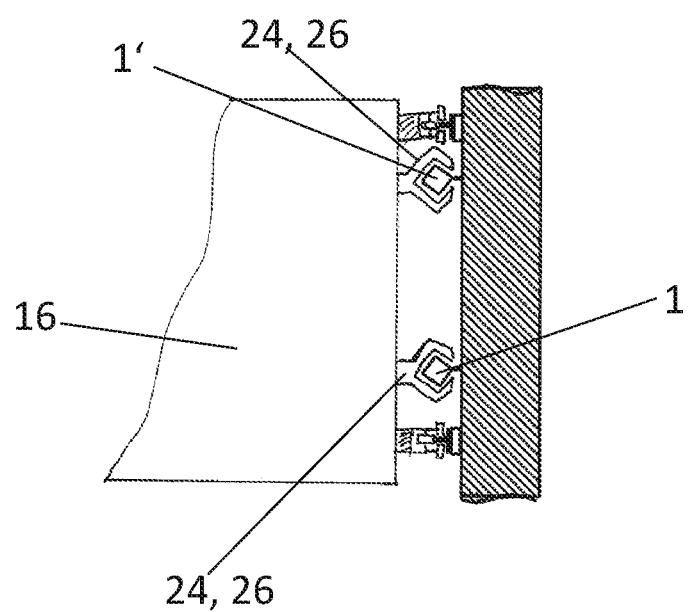
FIG. 6 shows a horizontal cross-section of the parts of the elevator motor and the guide rails in the area between the elevator car and the shaft wall of FIG. 5.

FIG. 5 shows a multicar elevator system according to an embodiment of the third aspect of the invention. Elevator system comprises plurality of elevator cars 16 each coupled to parallel stator beams 1, 1' (see FIG. 6) by means of the movers 24, 26. The cars are in a circular motion within two parallel elevator shafts 17. To each car four movers 24, 26 are installed, 2 per stator beam 1, 1". The linear motors are similar to those disclosed in the embodiments above, thus there are 32 rotor units per car and 32 inverters per car. All the inverters of the same car 16 are connected to common DC link, such that regenerative energy returning from one inverter back to DC link may be shared with/supplied to the other inverters. Each car 16 has a battery, which is connected to the common DC link.

The invention can be carried out within the scope of the appended patent claims. Thus, the above-mentioned embodiments should not be understood as delimiting the invention.

The invention claimed is:

1. A transport system, comprising:
    an electric linear motor including,
        a stator beam including at least two side faces at opposite sides of the stator beam, each of the at least two side faces including ferromagnetic poles spaced apart by a pitch, and
        a mover configured to move along the stator beam the mover including at least two counter-faces facing respective ones of the at least two side faces of the stator beam, at least one of the counter-faces including at least one rotor unit having at least one winding and at least one permanent magnet, such that the at least one winding and the at least one permanent magnet associated with the mover are configured to co-act with the ferromagnetic poles of the respective ones of the at least two side faces of the stator beam; and
    a control apparatus configured to,
        obtain position information of a mutual position of the ferromagnetic poles and the at least one rotor unit facing said ferromagnetic poles, the position information being obtained in a travelling direction of the rotor unit,
        represent d,q-coordinate system of the at least one rotor unit based on the position information such that a d-axis of the at least one rotor unit is in a direction of the ferromagnetic poles facing the at least one rotor unit and a q-axis of the at least one rotor unit is orthogonal to the d-axis,
        obtain information of a length of an air gap between the ferromagnetic poles and the at least one rotor unit facing the ferromagnetic poles, and
        supply, via at least one drive unit, a d-axis current component to the at least one winding of the at least one rotor unit to adjust the length of the air gap towards an air gap reference value, the d-axis current component being established based on a difference between the air gap reference value and the length of the air gap.

2. The transport system according to claim 1, wherein each of the at least two counter-faces includes a respective one of the at least one rotor unit such that each of the at least two counter-faces includes a respective one of the at least one winding and the at least one permanent magnet.

3. The transport system according to claim 1, wherein
    the at least two side faces of the stator beam includes at least four side faces located two by two at opposite sides of the stator beam, such that the at least four side faces substantially cover a circumference of the stator beam, each of the at least four side faces carrying ferromagnetic poles spaced apart by a pitch, and
    the at least two counter-faces of the mover includes at least four counter-faces facing respective ones of the at least four side faces of the stator beam, each of the at least four counter-faces including a respective one of the at least one rotor unit such that each of the at least four counter-faces includes a respective one of the at least one winding and the at least one permanent magnet.

4. The transport system according to claim 1, wherein
    the stator beam is a ferromagnetic stator rod, and
    the ferromagnetic poles are teeth provided on a side face of the ferromagnetic stator rod such that the teeth are spaced apart by teeth gaps.

5. The transport system according to claim 1, wherein the at least two side-faces carrying ferromagnetic poles of the stator beam do not include any of the at least one winding and the at least one permanent magnet.

6. The transport system according to claim 1, wherein each of the at least one rotor unit includes respective ones of the at least one winding and the at least one permanent magnet, each of the at least one winding being a three-phase motor winding.

7. The transport system according to claim 1, wherein the at least one rotor unit associated with each of the at least two counter-faces of the mover includes at least two rotor units arranged consecutively in a travelling direction, each of the at least two rotor units having a respective one of the at least one winding and the at least one permanent magnet.

8. The transport system according to claim 1, wherein each of the at least one rotor unit includes at least two rotors having windings connected in series or in parallel.

9. A control apparatus of an electric linear motor including a stator beam and a mover configured to move along the stator beam, the stator beam including at least two side faces at opposite sides of the stator beam, each of the at least two side faces including ferromagnetic poles spaced apart by a pitch, and the mover including at least two counter-faces facing respective ones of the at least two side faces of the stator beam, at least one of the counter-faces including at least one rotor unit having at least one winding and at least one permanent magnet, such that the at least one winding and the at least one permanent magnet associated with the mover are configured to co-act with the ferromagnetic poles of the respective ones of the at least two side faces of the stator beam, wherein the control apparatus comprises:
    at least one drive unit configured to supply electrical power to the at least one rotor unit of the mover; and
    processing circuitry configured to,
        obtain position information of a mutual position of the ferromagnetic poles and the at least one rotor unit facing said ferromagnetic poles, the position information being obtained in a travelling direction of the rotor unit,
        represent d,q-coordinate system of the at least one rotor unit based on the position information such that a d-axis of the at least one rotor unit is in a direction of the ferromagnetic poles facing the at least one rotor unit and a q-axis of the at least one rotor unit is orthogonal to the d-axis,
        obtain information of a length of an air gap between the ferromagnetic poles and the at least one rotor unit facing the ferromagnetic poles, and
        supply, via at least one drive unit, a d-axis current component to the at least one winding of the at least one rotor unit to adjust the length of the air gap towards an air gap reference value, the d-axis current component being established based on a difference between the air gap reference value and the length of the air gap.

10. The control apparatus according to claim 9, wherein the at least one drive unit comprises:

a plurality of drive units configured to supply electrical power separately to respective ones of the at least one rotor unit of the mover such that each of the at least one rotor unit is supplied by a separate one of the plurality of drive units.

11. A transport system comprising:
the control apparatus according to claim 9;
the electric linear motor; and
a mobile load-receiving part coupled to the mover and arranged to travel along a trajectory defined by the stator beam via a propulsion force of the mover.

12. The transport system according to claim 1, wherein the mover includes one or more movers each connected to a respective elevator car, the stator beam extends longitudinally along an elevator shaft and does not include any of the at least one winding and the at least one permanent magnet fixed thereto such that along a length of the elevator shaft only the one or more movers connected to the respective elevator car includes the at least one winding and the at least one permanent magnet.

13. A method of controlling an electric linear motor, the electric linear motor including a stator beam and a mover configured to move along the stator beam, the stator beam including at least two side faces at opposite sides of the stator beam, each of the at least two side faces including ferromagnetic poles spaced apart by a pitch, and the mover including at least two counter-faces facing respective ones of the at least two side faces of the stator beam, at least one of the counter-faces including at least one rotor unit having at least one winding and at least one permanent magnet, such that the at least one winding and the at least one permanent magnet associated with the mover are configured to co-act with the ferromagnetic poles of the respective ones of the at least two side faces of the stator beam, the method comprising:
obtaining position information of a mutual position of the ferromagnetic poles and the at least one rotor unit facing said ferromagnetic poles, the position information being obtained in a travelling direction of the rotor unit;
representing d,q-coordinate system of the at least one rotor unit based on the position information such that a d-axis of the at least one rotor unit is in a direction of the ferromagnetic poles facing the at least one rotor unit and a q-axis of the at least one rotor unit is orthogonal to the d-axis;
obtaining information of a length of an air gap between the ferromagnetic poles and the at least one rotor unit facing the ferromagnetic poles; and
supplying, via at least one drive unit, a d-axis current component to the at least one winding of the at least one rotor unit to adjust the length of the air gap towards an air gap reference value, the d-axis current component being established based on a difference between the air gap reference value and the length of the air gap.

14. The method according to claim 13, further comprising:
obtaining the position information for each of the at least one rotor unit;
representing d,q-coordinate systems of each of the at least one rotor unit based on the position information;
obtaining the information of the length of the air gap between the ferromagnetic poles and each of the at least one rotor unit facing said ferromagnetic poles; and
supplying, via drive units, separate d-axis current components to the windings of each of the at least one rotor unit at opposite sides of the stator beam to adjust the length of the air gap of each of the at least one rotor unit towards a respective air gap reference value, wherein the separate d-axis current components are established based on the difference between the air gap reference value and the length of the air gap.

15. The method according to claim 13, wherein the mover has, in at least one of the at least two counter-faces, at least two rotor units arranged consecutively in the travelling direction, each of the at least two rotor units having a respective one of the at least one winding and the at least one permanent magnet, and the electric linear motor is configured to be controlled by a control apparatus having drive units configured to supply electrical power separately to respective ones of the at least two rotor units of a same one of the at least two counter-faces, and the method further comprises:
supplying, via the drive units, separate d-axis current components to the respective one of the at least one winding of the same one of the at least two counter-faces to straighten a tilt of the air gap, the separate d-axis current components being established based on a difference between the air gap reference value and the length of the air gap.

16. The method according to claim 13, further comprising:
obtaining one or more of travel position information of a travel position of the mover or travel speed information of a travel speed of the mover; and
feeding, via the at least one drive unit, a q-axis current component to the at least one winding of the at least one rotor unit based on one or more of a difference between a travel position reference and the travel position information or a difference between a travel speed reference and the travel speed information to adjust one or more of the travel position of the mover or the travel speed of the mover towards the travel position reference or travel speed reference.

17. The method according to claim 16, further comprising:
feeding, via each of drive units, separate q-axis current components to each of the at least one winding of the at least one rotor units based on the one or more of the difference between the travel position reference and the travel position information or the difference between the travel speed reference and the travel speed information to adjust the one or more of the travel position or the travel speed towards the travel position or travel speed reference.

18. The method according to claim 13, further comprising:
changing a first one of the d-axis current component and a q-axis current component of the at least one rotor unit based on at least one of travel position information, travel speed information and air gap length information; and
changing a second one of the d-axis current component and the q-axis current component to compensate for a change to one or more of an attraction force or a propulsion force of the mover.

19. The method according to claim 13, further comprising:
calculating a propulsion force reference value based on one or more of a difference between a travel position reference and travel position information of the mover or a difference between a travel speed reference and travel speed information of the mover;

calculating an attraction force reference value based at least on a difference between the air gap reference value and the length of the air gap; and changing at least one of the d-axis current component and a q-axis current component of the at least one rotor unit based on a change in at least one of the propulsion force reference value, the attraction force reference value and the length of the air gap of the rotor unit.

20. The method according to claim 13, wherein the mover includes one or more movers each connected to a respective elevator car, the stator beam extends longitudinally along an elevator shaft and does not include any of the at least one winding and the at least one permanent magnet fixed thereto such that along a length of the elevator shaft only the one or more movers connected to the respective elevator car includes the at least one winding and the at least one permanent magnet.

* * * * *